Dec. 10, 1968  D. L. GRAY  3,415,489
VALVE BODY CONSTRUCTION
Filed Dec. 28, 1966  2 Sheets-Sheet 2
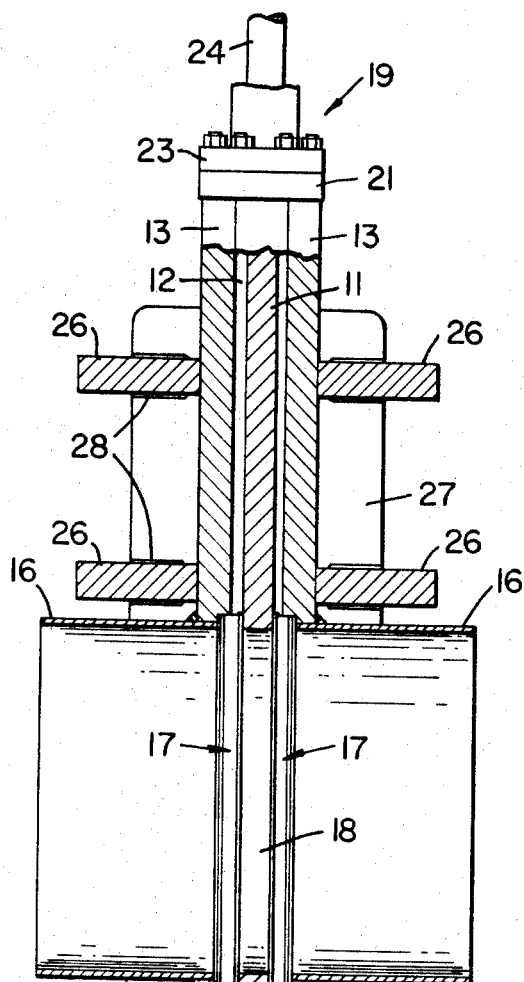
FIG_2
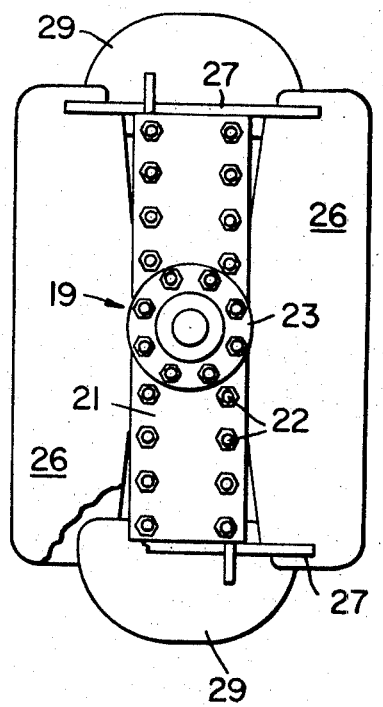
FIG_3
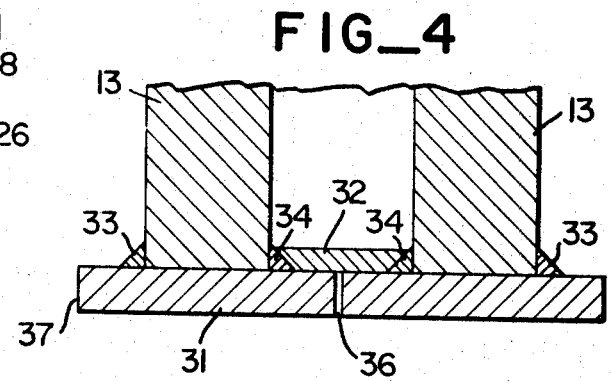
FIG_4
INVENTOR.
DONALD L. GRAY
BY
ATTORNEYS _United States Patent Office_

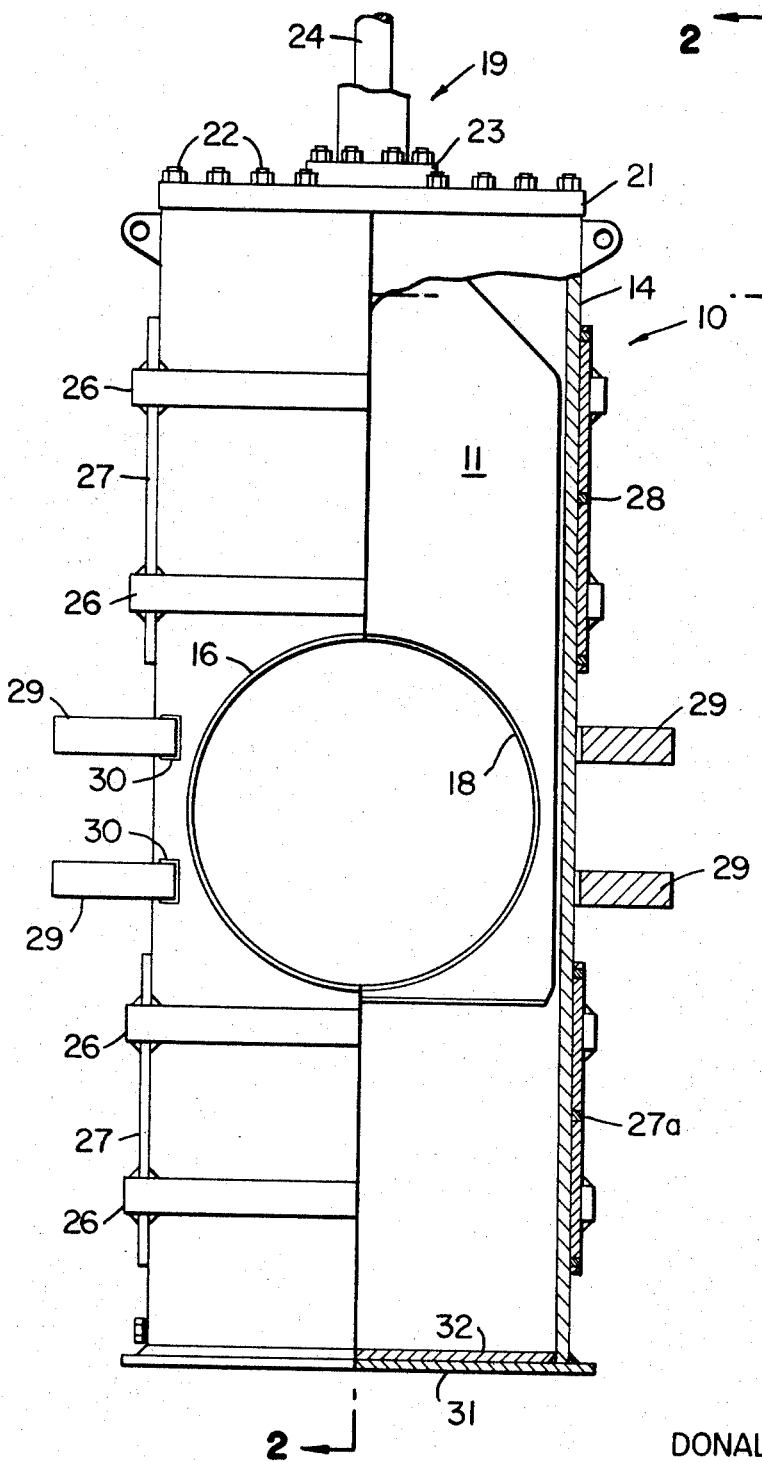
FIG_1

3,415,489
Patented Dec. 10, 1968

3,415,489
VALVE BODY CONSTRUCTION
Donald L. Gray, Houston, Tex., assignor to M & J Valve Company, Houston, Tex., a corporation of Delaware
Filed Dec. 28, 1966, Ser. No. 605,426
2 Claims. (Cl. 251—329)

ABSTRACT OF THE DISCLOSURE

A fabricated valve body made box-like with end and side walls and closed upper and lower ends. The lower end is closed by two plates, an outer plate that is welded to the exterior periphery of the end and side walls, and an inner plate which is seated on the outer plate and welded about its periphery to the end and side walls. A weep hole in the outer plate prevents build-up of pressure between the plates.

---

This invention relates generally to the construction of gate valve bodies of the fabricated type.

Fabricated gate valves have received wide acceptance and are used particularly for pipe line service in the petroleum and gas industries. The bodies of such valves are made of structural steel members welded together to form a box-like structure having end and side walls joined together along longitudinal corners. A bonnet assembly, through which the operating rod of the valve extends, is attached to the upper end of the body. Closure of the bottom end of the body presents a problem, particularly when the valves are designed for relatively high working pressures, and are made in the larger sizes, as for example, from 12 to 42″ pipe diameter. One arrangement which has been used consists of a series of plates that are inserted into the lower end of the valve body and successively welded about their peripheries to the inner periphery of the body. This requires a series of manual welding operations that are relatively expensive. In addition, there is always the possibility of pressure build-up between the plates due to leakage under operating conditions. It will be evident that any pressure build-up between members of a laminated closure will seriously weaken the closure assembly with respect to resisting internal body pressure. Another difficulty with the type of closure just described is that it does not provide an effective reinforcement to resist outward bulging of the end walls of the body under relatively high internal pressures.

In general, it is an object of the present invention to provide a closure for the lower end of a fabricated gate valve body which will overcome the disadvantages of prior closures and which in general will provide an assembly which is not weakened by leakage.

Another object of the invention is to provide a closure of the above character which is not weakened by leakage and which at the same time serves as an effective reinforcement for the end walls of the body.

Additional objects and features of the invention will appear from the following description in which the preferred embodiment has been set forth in detail in conjunction with the accompanying drawing.

In general the invention consists in providing an outer plate for the lower end of the body which is welded along the outer periphery of the end and side walls. In addition I provide an inner plate which normally seats upon the outer plate, and which is welded to the inner periphery of the end and side body walls. The outer plate is provided with a weep hole whereby if any leakage occurs past the inner plate, pressure cannot build up between the plates. The outer plate preferably is extended to provide rib reinforcement.

Referring to the drawing:

FIGURE 1 is an elevational view looking toward one end of the valve body;

FIGURE 2 is a side elevational view of the valve body of FIGURE 1 taken along the line 2—2 of FIGURE 1;

FIGURE 3 is a plan view of the body, looking toward the top of the same; and

FIGURE 4 is a large detail in section illustrating the closure means for the bottom or lower end of the body.

The embodiment of the invention shown in the drawing consists of a fabricated body 10 having a flat valve member or gate 11 disposed within the body space 12. The main part of the body is box-like or rectangular in section and consists of the relatively heavy end walls 13, made for example of mill plate, and the side walls 14. The end and side plates are joined along the longitudinal corners of the body. The end walls 13 have aligned openings forming flow passages which are shown connected to the pipe sections or hubs 16. Annular sealing assemblies 17 are shown carried by the end walls and serve to establish sealing relationship between the side valve working surfaces of the gate 11 and the body. The sealing assemblies may, for example, be similar to the assemblies disclosed and claimed in Patent 3,269,695. The valve in this instance is of the through-port type, and the gate has a port or opening 18 which is brought into registration with the flow passages for full open position of the valve.

The upper end of the main body portion is closed by the bonnet assembly 19. This assembly can consist of a plate 21 which is secured to the top of the body by suitable means such as stud bolts 22 together with a plate 23 which is bolted to the plate 21. The operating rod 24 for the gate extends through the bonnet assembly and is sealed to prevent leakage past the operating rod by suitable means such as sealing means of the O-ring type.

A suitable mechanical operator connects with the operating rod 24 to move the gate between full open and closed positions. This operating means may vary in different instances and, for example, may be manual, hydraulic, pneumatic, or electrical.

For the higher operating pressures it is desirable to provide rib reinforcement for the end walls 13. Thus several pairs of reinforcing ribs 26 extend across the body in supporting engagement with the end walls 13. In this particular instance two pairs are located above the hubs 16, and two pairs below the hubs. Plates 27 are attached to the sides of the body by suitable means, such as plug welding 27a, and these plates are slotted to receive the end portions of the ribs 26. Attachment between the ribs and the plates 27 is made by welding 28. The ribs 26 may or may not be directly welded to the end walls 13.

In addition to the ribs 26 it is frequently desirable to reinforce the body with the C clamps 29, which are attached to the end walls by welding 30.

The means provided for closing the lower end of the body consists of outer and inner plates 31 and 32. The outer plate is attached to the adjacent extremities of the end side walls 13 and 14 by the weld metal 33. This weld extends entirely about the periphery of the body, or in other words the periphery of the adjacent end and side walls. The inner plate 32 is attached by weld metal 34 to the adjacent portions of the end and side walls. It will be noted that the lower surface of the inner plate 32 is in contact with the upper surface of the exterior plate 31. In other words, the inner plate seats upon the outer plate. The outer plate 31 is provided with one or more small holes 36 which serve as weep holes to bleed off any leakage that might occur past the inner plate 32. Thus, the bleed hole 36 prevents any build-up of pressure between the plates 31 and 32 under operating conditions.

A satisfactory manufacturing procedure for forming the lower closure means is as follows. After the main body part has been fabricated, the ends are finished as by planing or grinding to provide flat end surfaces. The flat surface at one end serves to mount the bonnet assembly 19. The inner plate 32, with beveled edges, is inserted into the lower end of the body with its outer face flush with the adjacent end surfaces of the body. After light tack-welding in this position, a penetration weld is applied to provide a good junction between the periphery of the plate 32 and the adjacent inner periphery of the body. The plate 31 is then applied, and after tack-welding in the desired position, the exterior weld 33 is formed.

The plate 31 is preferably formed so that it is somewhat longer and wider than the main part of the body. This serves to provide reinforcing rib portions 37 which reinforce the adjacent portions of the end walls 13 against outward bulging under internal pressure. The plate 31 may of itself serve as a footing for the valve, or if desired, additional foot members may be applied.

It will be evident from the foregoing that I have provided a valve body having a relatively simple but effective closure for its lower end. Normally the inner plate 32 is relied upon for an effective seal. Under pressure conditions the inner plate 32 is reinforced against fluid pressure by the outer plate 31. Also the outer plate provides rib reinforcing for the adjacent portions of the end walls 13. In the event a slight amount of leakage occurs through or past the inner plate 32, no pressure build-up can occur between the two plates, because of the weep hole 36. Thus slight leakage cannot serve to destroy the ability of the closure to withstand the internal pressure.

I claim:

1. In a valve body construction of the fabricated type wherein the body is rectangular in section and consists of end and side walls joined along longitudinal corners and is provided with a bonnet assembly at the upper end of the body and a closure means at the bottom end of the body, the improvement comprising a bottom closure means consisting of an inner closure plate disposed within the lower margins of the end and side walls and welded thereto to form a fluid pressure retaining seal, the lower face of said plate being coincident with the plane of the adjacent end faces of the end and side walls, and another exterior plate secured to the lower margins of the end and side walls by exterior welding and extending across the lower face of the first named plate and in supporting contact therewith, said last-named plate having at least one opening therethrough to prevent build-up of fluid pressure between the plates.

2. A valve body construction as in claim 1 in which the exterior plate is dimensioned to provide reinforcing ribs which extend across and project outwardly from the adjacent portions of the end walls.

References Cited

UNITED STATES PATENTS

| 3,000,608 | 9/1961 | Williams | 251—329 X |
| 3,372,900 | 3/1968 | Grove | 251—329 X |

ARNOLD ROSENTHAL, *Primary Examiner.*